US005132165A

United States Patent [19]

Blanco

[11] Patent Number: 5,132,165

[45] Date of Patent: Jul. 21, 1992

[54] WET PRINTING TECHNIQUES

[75] Inventor: Louis A. Blanco, Eastchester, N.Y.

[73] Assignee: Commerical Decal, Inc., Mt. Vernon, N.Y.

[21] Appl. No.: 540,157

[22] Filed: Jun. 19, 1990

[51] Int. Cl.[5] .............. B32B 17/06

[52] U.S. Cl. .............. 428/210; 428/212; 428/325; 428/336; 428/428; 428/432; 428/688; 428/697; 428/701; 428/702; 428/914

[58] Field of Search .............. 428/914, 428, 432, 688, 428/336, 210, 212, 325, 336, 697, 701, 702

[56] References Cited

U.S. PATENT DOCUMENTS

| | | | |
|---|---|---|---|
| 3,791,841 | 2/1974 | Carmellini | 156/230 |
| 3,857,746 | 12/1974 | Blanco et al. | 428/204 |
| 3,898,362 | 8/1975 | Blanco | 428/432 |
| 3,956,558 | 5/1976 | Blanco | 428/432 |
| 4,068,033 | 1/1978 | Meade | 428/201 |
| 4,126,728 | 11/1978 | Holleran et al. | 428/210 |
| 4,264,679 | 4/1981 | Panzarino et al. | 428/428 |
| 4,303,717 | 12/1981 | Andrews | 428/914 |

FOREIGN PATENT DOCUMENTS

| | | | |
|---|---|---|---|
| 2357896 | 5/1974 | Fed. Rep. of Germany | 428/914 |
| 1094104 | 3/1965 | United Kingdom | 428/914 |
| 1420347 | 10/1973 | United Kingdom | 428/914 |

*Primary Examiner*—Ellis P. Robinson
*Assistant Examiner*—Archene A. Turner
*Attorney, Agent, or Firm*—Lerner, David, Littenberg, Krumholz & Mentlik

[57] ABSTRACT

Ceramic decalcomania adapted to be applied to virtreous surfaces are disclosed including a back sheet, a first prefused glass flux layer which is substantially free of lead oxide and which is at least about 2 microns thick disposed on the backing sheet, a design layer including at least one ceramic oxide pigment disposed on the first flux layer, and a second prefused glass flux layer disposed on the design layer. Methods for producing these ceramic decalcomanias are also disclosed, which include offset printing the first flux layer onto the backing sheet, forming a wet ink formulation free of glass and including a liquid printing vehicle and at least one oxide coloring agent, wet printing the wet ink formulation onto the first flux layer, and depositing a second flux layer onto the design layer.

20 Claims, No Drawings

WET PRINTING TECHNIQUES

FIELD OF THE INVENTION

The present invention relates to ceramic decalcomanias. More particularly, the present invention relates to ceramic decalcomanias which are produced by the wet printing of a design layer thereon. Still more particularly, the present invention relates to methods of producing overglaze ceramic decalcomanias. Still more particularly, the present invention relates to methods for producing ceramic decalcomanias by wet printing a design layer onto a backing sheet and depositing a protective coating of prefused glass flux on the wet design layer.

BACKGROUND OF THE INVENTION

The commercial field of ceramic decalcomanias and their production and application has developed quite slowly over the years. Thus, while significant techniques in the production of various types of decals, including overglaze ceramic decalcomanias, have developed significantly over the years, many of the same techniques have now been used commercially for a number of years without significant modification or improvement.

One of these techniques relates to the use of wet printing for designs in ceramic decalcomanias, in which a design layer is wet printed onto a backing sheet, and in a most preferable embodiment known as the four-color technique, in which four different basic colors are applied sequentially in such wet ink formulations.

The decals themselves usually thus comprise multilayered structures, which generally include a backing sheet, a design layer, and in most cases a protective layer which is applied on top of the design layer. The colors in the design layer are thus formed from inorganic pigments or oxides, and other layers can be used such as layers which facilitate release of the backing from the design layer and the like.

One of the various types of decals which are used in the ceramic industry is known as the "underglaze decal." This type of decal is applied to the ware and itself before glazing. However, a far more useful type of decal which has been developed is the so-called "overglaze decal" which can be applied to the ware after high temperature glaze has been applied to the ware and fired. These overglaze decals have generally been of two classes, namely silk screen and lithographic decals. In silk screening processes a silk screen template or stencil is placed over the surface to which the pigment or color is to be deposited, and it is then applied through the screen.

In many prior art patents including British Pat. No. 1,094,104 to Johnson, Mathey & Co., ceramic pigment transfers are disclosed which include inks with a printing medium or varnish incorporating a ceramic pigment being applied to a backing sheet over which a covering layer of an adhesion promoting flux of glass forming constituents is applied. This covering layer can be fused to form a protective layer after firing, and the flux itself can include constituents which are adapted to form a lead borosilicate glass, such as lead oxide, boric acid and silica. However, in employing such techniques, since these glass forming constituents have different melting points, the application of same over a pigment causes the pigment to become spotty.

In accordance with U.S. Pat. No. 3,898,362, which is assigned to the assignee of the present application, an improved wet printing technique is disclosed in which overglaze ceramic decalcomanias are provided from a wet ink formulation free of glass and including oxide coloring agents and a liquid printing medium such as drying oil, varnish or resin. The decalcomanias are thus produced by wet printing the wet ink formulation onto a decalcomania backing sheet to form a wet design layer free of glass, and by then separately depositing onto the wet design layer a protective coating in the form of a prefused glass flux, which may also be initially deposited on the backing sheet and the wet design layer printed thereover. In this manner when the decalcomania is positioned on a ware and fired, the protective coating fuses and tightly binds the design layer to the ware.

The ink used in this technique can contain from about 30 to about 60 wt. % of the oxide colorant, and there is a general reference in column 5 of this patent to the possibility of printing a prefused glass flux as a direct or moist coating onto the backing paper prior to printing. This latter technique, however, has not found any commercial application, although the general technique disclosed in this patent has. The search for improved wet printing techniques, in which four-color design layers can be readily and accurately applied to such overglaze decalcomanias, has therefore continued.

SUMMARY OF THE INVENTION

In accordance with the present invention, a ceramic decalcomania has now been discovered for application to vitreous surfaces comprising a backing sheet, a first prefused glass flux layer having a thickness of at least about 2 microns and being substantially free of lead oxides disposed on the backing sheet, a design layer comprising at least one ceramic oxide pigment disposed on the first flux layer, and a second prefused glass flux layer disposed on the design layer.

In accordance with a preferred embodiment of the ceramic decalcomanias of the present invention, the first flux layer has a coefficient of thermal expansion of less than about $60\times10^{-7}/°C.$, and the second flux layer preferably has a coefficient of thermal expansion which is greater than that of the first flux layer, and which is preferably greater than about $65\times10^{-7}/°C.$, and most preferably greater than about $70\times10^{-7}/°C.$ In accordance with a preferred embodiment of the ceramic decalcomania of the present invention the first flux layer includes a mixture of metallic oxides, preferably including cadmium oxide and zirconium oxide, and the first flux layer preferably also includes sodium fluoride. In a preferred embodiment, the first flux layer includes a flux medium, and preferably the ratio of flux to flux medium in the first flux layer is between about 1:2 to 2:1.

In accordance with another embodiment of the present invention a ceramic decalcomania has been discovered for application to vitreous surfaces comprising a backing sheet, a first prefused glass flux layer having a first melting point disposed on the backing sheet, a design layer comprising at least one ceramic oxide pigment disposed on the first flux layer, and a second prefused glass flux layer having a second melting point disposed on the design layer, where the first melting point is lower than the second melting point. In a preferred embodiment the first melting point is at least about 10° C. lower than the second melting point.

In accordance with a preferred embodiment of the ceramic decalcomanias of the present invention the first flux layer has a thickness of at least about 2.5 microns, and preferably at least about 3 microns.

In accordance with the method of preparing ceramic decalcomanias of the present invention the method includes forming a first prefused glass flux layer, offset printing the first flux layer onto a decalcomania backing sheet, forming a wet ink formulation free of glass and comprising a liquid printing vehicle and at least one oxide coloring agent, wet printing the wet ink formulation onto the first flux layer to form a wet design layer, forming a second prefused glass flux layer, and depositing the second flux layer onto the wet design layer.

In accordance with a preferred embodiment of the method of the present invention the offset printing step provides the first flux layer which is free of lead oxide, and which is preferably at a thickness of at least about 2 microns, and most preferably the wet printing step includes a plurality of wet printing steps.

In accordance with another embodiment of the method of the present invention the wet ink formulation comprises greater than 60 wt. % of a mixture of the ceramic oxide pigments, and preferably between about 20 and 30 wt. % of vehicle and between about 70 and 80 wt. % of the oxides.

In a preferred embodiment the vehicle has a viscosity of less than about 45 Stokes, and most preferably comprises blown linseed oil.

DETAILED DESCRIPTION

One of the greatest difficulties which has been encountered in connection with prior wet printing techniques has been the fact that the ceramic oxide pigments which are used in such techniques are rather heavy or viscous substances, and it therefore becomes difficult to apply many of these colors in large enough amounts such that a vivid dark color results. Thus, in prior techniques such as that disclosed in U.S. Pat. No. 3,898,362 discussed above, the inks could not contain more than about 60 wt. % of the oxide colorant component without becoming far too viscous to provide acceptable colors.

In accordance with the present invention, however, in one embodiment far greater amounts of oxide colorant can now be used. This has now been accomplished by employing the oxide in connection with a varnish component having a lower viscosity than that previously used, and most particularly less than about 45 Stokes. The result of this is, in turn, that the ink formulation which is generally applied through a fountain onto rollers, can now result in greater application of the oxide colorants to the decalcomania surface, and this can now be done for all of the colors being used commercially. This is particularly significant in that many of these colors are quite difficult to apply by wet printing techniques, and this applies, for example, to blue colors, which are primarily based upon the presence of cobalt oxide in the ink formulations.

In accordance with the present invention this is not only overcome by the presence of increased amounts of the ceramic oxide pigments in the ink formulations, but by the critical application of a first prefused glass flux layer, of a specific nature and in specific amounts, onto the backing sheet prior to application of the wet ink formulations thereto. This aspect of the present invention is discussed in more detail below.

The decalcomanias of the present invention begin with any suitable backing layer. These can include a dry strippable backing or a solvent mount or a water mount slide-off decal. The backing may be of paper or other suitable material such as, for example, plastic, fabric, etc. It is most preferred that the backing comprise paper which is coated with a release material, such as dextrine-coated paper. Other possible backing layers are coated with polyethylene glycol and primary aliphatic oxyethylated alcohols.

In order to employ the wet printing techniques of the present invention as discussed above, it is essential that an initial prefused glass flux layer first be applied to the backing layer, such as dextrine-coated paper. It is found to be important that the first prefused glass flux layer have a thickness of at least about 2 microns, preferably at least about 2.5 microns, more preferably between about 3 and 4 microns. The reason for this is that the initial flux layer of the present invention has been found, when applied to such a thickness, to absorb the wet inks which are printed directly thereon and thus enable wet printing to take place in a series of steps, and for it to be done immediately after each wet printing step is carried out thereon. The absorbency or surface of the first flux layer thus creates a capillary action which occurs with the dried flux layer and thus enables one to apply a heavier or stronger color deposition thereto. This capillary action is believed to assist in pulling or drawing the color off of the offset blanket employed in these printing processes. It has been discovered that the porous nature of the first flux layer hereof is a function of the particle size of the flux. Thus, smaller (in the range of 1 micron) particles result in a smoother, less porous surface. It is therefore important that the first flux layer comprise larger particles, and preferably greater than about 3 microns, e.g., between about 3 and 10 microns. This permits one to achieve the significant results obtainable with this invention, including absorption of the color and much shorter drying time between the printing of the design layers hereof. Thus, for example, four-color printing can be essentially instantly printed thereonto without consideration of the need for undue drying time. Again, this is due to the absorbency of the initial flux layers of the present invention. In addition, this first flux layer also helps to stabilize certain of the colors later wet printed thereonto. Most particularly, there has been a problem with the color red, in that the cadmium and/or selenium used to produce that color have been known to volatilize during the firing process. The presence of the first flux layer hereof, however, minimizes this and retains the red, as well as the yellow, color far more efficiently than in the past. This is particularly true when the first flux layer is substantially free of lead oxides, and more so when it includes cadmium and/or zirconium oxide, as well as sodium fluoride. By being substantially free of lead, it is understood that the amount of lead oxides in the first flux layer is significantly reduced as compared to such amounts used in typical prior lead borosilicate compositions, and in particular, the flux layer will include less than 20 wt. % of lead oxides, preferably less than 10 wt. %, and most preferably essentially all of the lead oxides are eliminated therefrom.

In order to produce the first flux layer in the thickness required, it is necessary to utilize a screen printing technique. Preferably, this screen printing process will employ a flux layer which includes a combination of flux and flux medium in a ratio of from about 1:2 to 2:1 as between the flux and the medium itself, preferably between about 1:1 to 1.5:1. The medium for use with the first flux layer of the present invention is a prefused glass flux layer which is colorless so as not to interfere with or mask the colors of the design layer. The prefused glass flux may include a metallic oxide, which will generally be present in amounts within the range of from about 0.5 to 8 wt. % thereof, preferably between about 3 and 6 wt. % thereof.

As noted above, in order to screen print the first flux layer onto the backing layer at these required thicknesses, the first flux layer is preferably combined with a flux medium in the ratios set forth above. The medium itself preferably includes an acrylic resin component, preferably acrylic and methacrylic polymers and copolymers such as polybutylacrylate, methyl methacrylate/butyl methacrylate copolymer, polyethyl acrylate, polymethyl acrylate, etc. Particularly suitable are acrylic resins of the Carboset® series (Carboset® is a trademark of B. F. Goodrich Company), such as Carboset® 514A, which is a 70% solution of low molecular weight acrylic copolymer in isopropyl alcohol. Acryloid resins are also potentially used, such as ethyl methacrylate copolymer B-72, and methyl methacrylate copolymer B-48N, produced by Rohm & Haas Company, Inc.

A liquid plasticizer is also preferably employed in this medium. These include the phthalates, such as dioctyl phthalate.

Preferably the flux medium for the first flux layer also includes a cellulosic derivative, which reduces the tackiness of the acrylic resins used herein. Examples of suitable cellulosic derivatives include cellulose acetate butyrate, ethyl cellulose, methyl cellulose, etc. Preferred are cellulose acetate butyrates having a melting point ranging from about 265° to about 465° F., preferably 400° F.

Finally, the first flux medium of the present invention is employed in conjunction with one or more organic solvents which will substantially dissolve all of the solids to provide a flowable, but viscous, lacquer-like consistency to the composition. Such solvents may thus include any of the known organic solvents for these components. Examples of such solvents include aromatic solvents such as any of the Solvesso® (trademark of Exxon Corporation) line of solvents, such as Solvesso® 150 and 100, alcohols such as butyl alcohol, and diacetone alcohol, chlorinated hydrocarbons such as trichlorobenzene, ketones such as cyclohexanon, esters such as ethyl lactate, butyl lactate and isobutyl lactate, methyl, butyl and ethyl Cellosolve® (trademark of Union Carbide corporation), monomethyl ether acetate of ethylene glycol, monomethyl ether of ethylene glycol and mixtures thereof, and the like.

As for the flux itself, this can comprise a low melting point glass composed essentially of powdered borosilicate glass which may also include increments of one or more of the oxides of lithium, sodium, potassium, magnesium, calcium, aluminum, cadmium, zirconium, titanium, lead, silicon, boron, and the like. The first prefused glass flux layer may, for example, thus be formed according to the following formulation:

| Ingredient | % by Wt. |
|---|---|
| Cadmium Oxide | 3.0 |
| Lithium Oxide | 2.0 |
| Sodium Oxide | 0.5 |

-continued

| Ingredient | % by Wt. |
|---|---|
| Magnesium Oxide | 0.5 |
| Calcium Oxide | 0.2 |
| Zinc Oxide | 5.0 |
| Barium Oxide | 5.0 |
| Alumina | 10.0 |
| Chromium Oxide | 0.2 |
| Boric Oxide | 23.0 |
| Silica | 35.0 |
| Titanium Dioxide | 0.3 |
| Zirconium Oxide | 12.0 |
| Tin Oxide | 0.3 |
| Sodium Fluoride | 3.0 |

As is discussed above, the first flux layer in accordance with the present invention is extremely important in stabilizing the wet design layer which is applied thereto, and in fact does so in a manner which permits four-color offset printing to be carried out quickly and effectively thereon. The specified first flux layers of the present invention are thus able to absorb these wet inks and enable wet printed layers to be immediately applied thereonto without the problems which have previously occurred therewith. In particular, one of these problems has been referred to "piling" of the colors. That is, if the flux layer is too smooth and it does not absorb the wet inks sufficiently, this will occur. Specifically, the absorbent first flux layer of this invention will "pull" the color off the press blanket by capillary action. When the ink is not receptive to the substrate, however, the colors will build up or "pile" up on the offset blanket, particularly on later color prints after the initial color has been printed thereon.

A wet design layer in accordance with the present invention may then be applied to the first flux layer which has been deposited onto the backing sheet. The wet design layer can comprise one or more layers of an ink comprising an oxide colorant and a printing medium or vehicle without a glass flux or binder therein. The ink should contain in this case from about 70 to about 80 wt. %, preferably from about 70 to about 75 wt. % of the oxide colorant, and most preferably greater than about 65 wt. % thereof. In the past, such as in the process used in accordance with U.S. Pat. No. 3,898,362, the upper limit for pigment or color loading was 60 wt. % pigment to 40 wt. % varnish. That process, due to the higher viscosity of the varnish used, as well as the poor wetting of the oxides themselves, resulted in extremely poor distribution of the color or mixture from roller to roller on the offset presses utilized therefor. The ink roller or ductor which thus removes the color from the offset fountain could therefore not pick up enough color because of these poor flow characteristics. On the other hand, the wet ink formulations which can now be employed in accordance with the present invention have excellent wetting characteristics for the oxides being used. Thus, with the use of these low viscosity varnishes, the flow properties of these inks remain excellent even at high pigment loadings.

The nature of the printing medium or vehicle used in the wet design layers of the present invention is thus an important element of this invention. Thus, the printing medium in this case should be formed from one or more of such materials as drying oils, varnishes, or resins, which particularly have a viscosity of less than about 45 Stokes. In a most preferred embodiment applicant has thus discovered that, by using a linseed oil varnish having a viscosity of less than about 45 Stokes, such as blown linseed oil having a viscosity of 36.2± poise, it is possible to apply greater amounts of color in accordance with the wet printing step of the present invention than has previously been permissible. As for the specific resins having these properties, they can be resins such as alkyds, as well as alkali-refined linseed oil, tung oil, modified vinyl or styrene linseed oil bodied with modified phenolic resins, polyurethane resin, modified soybean oils, polymerized linseed oil, oxidized linseed oil, boiled linseed oil, and semioxidized linseed oil.

Various additives may also be incorporated into the vehicles hereof, such as, for example, dryers, promoters, and/or accelerators. Again, however, by using the specified vehicles of the present invention, it is possible to increase the amount of oxide colorant on a percentage basis applied in accordance with the wet printing techniques hereof. Furthermore, the overall decalcomanias of this invention can accept such high amounts of colorant primarily because of the use and nature of the first flux layer discussed above. Again, little or no drying time is required between the printing steps hereof due to the absorbency of the first flux layer vis-a-vis the wet inks hereof.

The specific oxide coloring agents used in the design layers hereof comprise ceramic pigments, generally having an average particle size within the range of from about 0.10 to about 7.0 microns, preferably from about 0.3 to about 4.0 microns, which are incorporated into the binder vehicles discussed above. Preferably, the pigments are metallic oxides of fine particle size, such as an average particle size of less than about 1 micron. The pigments which may be used and the manner of their use are known to those skilled in this art. The oxide of the following elements are mentioned merely by way of example of some suitable ceramic pigments and the colors obtainable therefrom.

| Oxides of | Color |
|---|---|
| Fe, Cr, Zn | Brown |
| Co, Cr, Al | Blue |
| Cr | Green |
| Pb, Sb, Zn | Yellow |
| Cd, Zn | Yellow |
| Cd, Zn, Se | Red |
| Co, Fe, Cr | Black |

As discussed above, no glass is present in the design layers hereof. While the ink formulations may be varied depending on the oxides employed, as is well known to those skilled in this art, some typical ink formulations wherein the parts are expressed as parts by weight are as follows:

(1) 100 parts blown linseed oil, 2 parts manganese drier (NAP ALL ® from Mooney Chemicals, Inc.) and 4 parts lead drier (NEO NAP ®, also from Mooney Chemicals, Inc.) and (2) 50 parts blown linseed oil, 50 parts soybean oil, 2 parts manganese drier, and 4 parts lead drier.

The second prefused glass flux layer of the present invention is then applied over the design layer thereof. Thus, while one purpose of the first flux layer is to bind or fuse the glass-free metallic oxides in the design layer, the second flux layer is primarily intended to impart a smooth, glossy finish to the fired colors, and to further stabilize the red and yellow colors in the firing process. This second flux coating or layer of glass will be similar to the first flux layer, but in this case has several characteristics which are different from those of the first flux layer. Firstly, the second glass flux layer can be thicker than the first glass flux layer. Thus, the second glass flux layer will generally have a thickness of between about 4 and 7 microns, and generally between about 4 and 5 microns. Secondly, the first glass flux layer should have a coefficient of thermal expansion which is lower than that of the second glass flux layer. Thus, the first glass flux layer should have a coefficient of thermal expansion of less than about $60\times10^{-7}/^{\circ}C.$, e.g. between about 50 and $60\times10^{-7}/^{\circ}C.$, and generally between about 52 and $58\times10^{-7}/^{\circ}C.$ It is, in fact, the presence of the second glass flux layer which renders it important to use a low expansion flux as the first glass flux layer. That is, the second glass flux layer is used to impart a smooth glassy finish to the glass-free metallic oxides in the design layer. However, since two such glass flux layers are employed in this case, if the thickness of both of these flux layers in combination is too great, crazing can occur when the decalcomanias of this invention are applied to low expansion ceramic wares. Thus, the low expansion first flux layer is needed to reduce that possibility. Crazing is the formation of a network of surface cracks or actual color peeling off of the ware itself. This is caused when tensile stresses are created which are greater than that which can be withstood by the glaze itself. These stresses are, in turn, created by a mismatch between the expansion of the glaze and the expansion of the fluxes utilized in the decalcomanias themselves.

Additionally, it is also essential that the first flux layer fuse before the second glass flux layer in the firing process. That is, the first flux layer must therefore be a low melting point glass, i.e., at least have a lower melting point than that of the second glass flux layer. If not, blistering or pinholes or roughness will develop when the decals hereof are fired.

The prefused flux which can be used for the second glass flux layer may, for example, be formed according to the following formulation.

| Ingredients | Wt. % |
|---|---|
| Lead Oxide | 16.4 |
| Boric Oxide | 10.0 |
| Silica | 43.3 |
| Alumina | 8.2 |
| Zirconium | 8.2 |
| Cadmium Oxide | 3.8 |
| Sodium Oxide | 2.3 |
| Sodium Fluoride | 7.8 |

It is also noted that a lead-free flux can be employed as the second flux layer, but, if so, it must have a higher melting point than that utilized as the first flux layer.

In order to prepare the improved decalcomanias of the present invention, the first prefused glass flux layer of the present invention is initially prepared and applied to a backing sheet, such as a dextrine-coated paper sheet, by means of a conventional screen printing technique. This layer is applied to the backing sheet at a thickness of between about 3 and 5 microns, but at least about 2 microns thick. The first flux layer preferably has a coefficient of thermal expansion of between about 50 and $60\times10^{-7}/^{\circ}C.$ It is then possible to wet print the design layer according to conventional wet printing techniques directly onto the first prefused glass flux layer hereof. These conventional techniques include screen printing or offset lithography in which the wet design layers as discussed above are applied thereto. The four-color offset printing technique is preferably used in this step of the process hereof. These steps can be immediately applied with high color concentrations without the problems of the prior art. Finally, the second glass flux layer of the present invention can then be applied over the design, again by various methods such as silk screening, offset printing, or by printing a clear film over the design and then dusting a prefused flux over the film. If desired, the dusting operation may be eliminated by incorporating the flux into a film such as a printing varnish, oil or resin. It is important, however, that the second glass flux layer have a coefficient of thermal expansion which is greater than that of the first flux layer, and which is preferably at least about $65\times10^{-7}/°C.$, and preferably greater than about $70\times10^{-7}/°C.$, e.g. between about 70 and $80\times10^{-7}/°C.$ Preferably both the first and second glass flux layers will include metallic oxides of both cadmium and zirconium. The second glass flux layer should also have a melting point which is higher than that of the melting point of the first glass flux layer, and which is preferably between about 10° and 30° C., preferably greater than about 5° C. higher than that of the first glass flux layer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A ceramic decalcomania adapted to be applied to a vitreous surface comprising a backing sheet, a first prefused glass flux layer having a thickness of at least about 2 microns disposed on said backing sheet, said first flux layer being substantially free of lead oxide, having a first melting point, and having a first coefficient of thermal expansion, a design layer comprising at least one ceramic oxide pigment disposed on said first flux layer, and a second prefused glass flux layer disposed on said design layer, said second prefused glass flux layer having a second melting point, and having a second coefficient of thermal expansion, said first flux layer having an average particle size of greater than about 3 microns whereby said first flux layer is sufficiently porous so as to absorb said pigment disposed in said design layer, said second coefficient of thermal expansion being greater than said first coefficient of thermal expansion, and said first melting point being lower than said second melting point.

2. The ceramic decalcomania of claim 1 wherein said first flux layer has a coefficient of thermal expansion of less than about $60\times10^{-7}/°C.$

3. The ceramic decalcomania of claim 2 wherein said second flux layer has a coefficient of thermal expansion of greater than about $70\times10^{-7}/°C.$

4. The ceramic decalcomania of claim 1 wherein said first flux layer comprises a mixture of metallic oxides including cadmium oxide and zirconium oxide.

5. The ceramic decalcomania of claim 4 wherein said first flux layer includes sodium fluoride.

6. The ceramic decalcomania of claim 1 wherein said second flux layer comprises a mixture of metallic oxides including cadmium oxide and zirconium oxide.

7. The ceramic decalcomania of claim 6 wherein said first flux layer includes sodium fluoride.

8. The ceramic decalcomania of claim 1 wherein said at least one ceramic oxide pigment in said design layer is applied by means of a wet printing vehicle having a viscosity of less than about 45 Stokes.

9. The ceramic decalcomania of claim 1 wherein said first flux layer has a thickness of at least about 3 microns.

10. The ceramic decalcomania of claim 2 wherein said first flux layer includes a flux medium.

11. The ceramic decalcomania of claim 10 wherein the ratio of said flux layer to said flux medium in said first flux layer is between about 1:2 and 2:1.

12. The ceramic decalcomania of claim 10 wherein said flux medium comprises cellulose acetate butyrate.

13. A ceramic decalcomania adapted to be applied to a vitreous surface comprising a backing sheet, a first prefused glass flux layer having a first melting point, a thickness of at least about 2 microns, an average particle size of greater than about 3 microns, and a first coefficient of thermal expansion disposed on said backing sheet, a design layer comprising at least one ceramic oxide pigment free of glass disposed on said first flux layer, and a second prefused glass flux layer having a second melting point, and a second coefficient of thermal expansion, disposed on said design layer, said first melting point being lower than said second melting point, and said second coefficient of thermal expansion being greater than said first coefficient of thermal expansion.

14. The ceramic decalcomania of claim 13 wherein said first melting point is at least about 10° C. lower than said second melting point.

15. The ceramic decalcomania of claim 13 wherein said first flux layer is substantially free of lead oxide.

16. The ceramic decalcomania of claim 13 wherein said first flux layer has a thickness of at least about 2.5 microns.

17. The ceramic decalcomania of claim 16 wherein said first flux layer has a thickness of at least about 3 microns.

18. The ceramic decalcomania of claim 13 wherein said first flux layer includes a flux medium.

19. The ceramic decalcomania of claim 18 wherein the ratio of said flux layer to said flux medium in said first flux layer is between about 1:2 and 2:1.

20. The ceramic decalcomania of claim 18 wherein said flux medium comprises cellulose acetate butyrate.

* * * * *

UNITED STATES PATENT AND TRADEMARK OFFICE

CERTIFICATE OF CORRECTION

PATENT NO. : 5,132,165

DATED : July 21, 1992

INVENTOR(S) : Louis A. Blanco

It is certified that error appears in the above-identified patent and that said Letters Patent is hereby corrected as shown below:

On the title page, Item

[73] Assignee: "Commerical" should read --Commercial--.

Column 1, line 43, following "decal." insert --"--.

Column 1, line 44, cancel """.

Column 6, line 25, following "to" insert --as--.

Column 9, line 45, following "pigment" insert --free of glass--.

Signed and Sealed this

Twenty-fourth Day of August, 1993

Attest:

BRUCE LEHMAN

*Attesting Officer* *Commissioner of Patents and Trademarks*